United States Patent
Hatakeyama et al.

(10) Patent No.: US 9,755,524 B2
(45) Date of Patent: *Sep. 5, 2017

(54) DC-DC CONVERTER

(71) Applicant: Hitachi, Ltd., Chiyoda-ku, Tokyo (JP)

(72) Inventors: Tomoyuki Hatakeyama, Hitachinaka (JP); Takae Shimada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 373 days.

This patent is subject to a terminal disclaimer.

(21) Appl. No.: 14/563,693

(22) Filed: Dec. 8, 2014

(65) Prior Publication Data
US 2015/0092452 A1 Apr. 2, 2015

Related U.S. Application Data

(63) Continuation of application No. 13/806,819, filed as application No. PCT/JP2010/004221 on Jun. 25, 2010, now Pat. No. 8,934,265.

(51) Int. Cl.
*H02M 3/335* (2006.01)
*H02M 3/337* (2006.01)
*H02M 3/24* (2006.01)
*H02M 1/00* (2006.01)

(52) U.S. Cl.
CPC ......... *H02M 3/33507* (2013.01); *H02M 3/24* (2013.01); *H02M 3/3376* (2013.01); *H02M 3/33538* (2013.01); *H02M 2001/0032* (2013.01); *Y02B 70/16* (2013.01)

(58) Field of Classification Search
CPC .. H02M 3/28; H02M 3/33569; H02M 3/3376; Y02B 70/1433

USPC .............. 363/15–17, 21.02, 21.03
See application file for complete search history.

(56) References Cited

U.S. PATENT DOCUMENTS

| | | |
|---|---|---|
| 5,963,436 A | 10/1999 | Yoshida |
| 6,452,816 B2 | 9/2002 | Kuranuki et al. |
| 6,856,521 B1 * | 2/2005 | Chen ................ H02M 3/33592 363/132 |
| 7,796,405 B2 | 9/2010 | Popescu et al. |

(Continued)

FOREIGN PATENT DOCUMENTS

| | | |
|---|---|---|
| JP | 63-33337 U | 3/1988 |
| JP | 3-251079 A | 11/1991 |

(Continued)

OTHER PUBLICATIONS

Corresponding International Search Report with English Translation dated Sep. 28, 2010 (five (5) pages).

(Continued)

*Primary Examiner* — Nguyen Tran
(74) *Attorney, Agent, or Firm* — Crowell & Moring LLP

(57) ABSTRACT

Provided is a vehicle which enables a highly-efficient DC-DC converter and a highly-efficient power supply to a load, regardless of a power supply amount of to the load. When the power supply amount to a load R1 is a predetermined value or more, a control means 5 implements a first mode for making the switching elements S1 to S4 driven, and when the power supply amount of to the load R1 is the predetermined value or less, the control means 5 implements a second mode, for making the switching elements S3 and S4 stopped in an OFF state, and making only the switching elements S1 and S2 driven.

10 Claims, 17 Drawing Sheets

(56) References Cited

U.S. PATENT DOCUMENTS

| | | |
|---|---|---|
| 7,826,236 B2 | 11/2010 | Dishman et al. |
| 2004/0136209 A1 | 7/2004 | Hosokawa et al. |
| 2009/0059622 A1 | 3/2009 | Shimada et al. |
| 2012/0300502 A1 | 11/2012 | Shimada et al. |

FOREIGN PATENT DOCUMENTS

| | | |
|---|---|---|
| JP | 2001-339945 A | 12/2001 |
| JP | 2002-238257 A | 8/2002 |
| JP | 2003-47245 A | 2/2003 |
| JP | 2003-180075 A | 6/2003 |
| JP | 2003-324956 A | 11/2003 |
| JP | 2004-215469 A | 7/2004 |
| JP | 2005-229783 A | 8/2005 |
| JP | 2007-202370 A | 8/2007 |
| JP | 2009-55747 A | 3/2009 |

OTHER PUBLICATIONS

Korean Office Action dated Nov. 29, 2013 (5 pages).
Kutkut "A Full Bridge Soft Switched Telecom Power Supply with a Current Doubler Rectifier"Soft Switching Technologies Corporation, IEEE, p. 344 (partial copy).
Japanese Office Action dated Aug. 18, 2015 (Four (4) pages).

* cited by examiner

DC-DC CONVERTER

CROSS REFERENCE TO RELATED APPLICATIONS

This application is a continuation of U.S. patent application Ser. No. 13/806,819, filed Dec. 24, 2012, which is a U.S. national stage of filed PCT International Application No. PCT/JP2010/004221, filed Jun. 25, 2010, the entire disclosures of which are expressly incorporated by reference herein.

TECHNICAL FIELD

The present invention relates to a DC-DC converter having insulating function.

BACKGROUND ART

A conventionally known DC-DC converter is a device for outputting a power by converting DC power to AC power by a switching circuit, transforming this using a transformer, and converting this to DC power by a rectifier circuit. In handling large power, it is general that a full bridge circuit is used. In this full bridge circuit, a switching element at the upper arm side and a switching element at the lower arm side of two pairs of switching elements connected in series, are driven alternately. That is, the switching element at the upper arm side and the switching element at the lower arm side implement reverse on/off drive mutually. However, it became hard switching in turn-on and turn-off of the switching element, which generated a large switching loss, resulting in inferior efficiency.

To solve this problem, a DC-DC converter to reduce the switching loss and to improve efficiency has been disclosed in PATENT DOCUMENT 1. This DC-DC converter is implemented by shifting a phase of on/off drive of one switching element connected in series and on/off drive of the other switching element connected in series, composing the full bridge circuit. In this way, zero voltage switching becomes possible, and reduction of the switching loss is attained. This control system is called a phase shift system.

In addition, in PATENT DOCUMENT 2, there has been disclosed the attainment of enhancement of efficiency and reduction of output ripple, by making either of one set of the switches of a full bridge circuit continuation-on, and the other continuation-off, when a load becomes light, in a resonant circuit.

CITATION LIST

Patent Literature

PATENT LITERATURE 1: JP-A-2003-47245
PATENT LITERATURE 2: JP-A-2003-324956

SUMMARY OF INVENTION

Technical Problem

The full bridge circuit of the phase shift system enables zero voltage switching, in large power supply amount to a load, however, time required in charge-discharge of a parasitic capacitance of the switching element becomes long, due to small current flowing in a circuit, in small power supply amount to a load. Implementing of turn-on of the switching element in a state of this insufficient charge-discharge, as it is, provides hard switching, which provided a problem of increase in switching loss and decrease in efficiency.

In addition, in the full bridge circuit of the phase shift system, charge-discharge of the parasitic capacitance of the switching element is utilized, whereas the resonant circuit is based on frequency control, thus, operation principle itself differs, therefore technology applicable to the resonant circuit cannot be applied to a circuit of the phase shift system, even though problems to be solved are common.

It is an object of the present invention to provide a highly-efficient DC-DC converter, regardless of a power supply amount of to a load.

In addition, it is an object of the present invention to provide a vehicle which enables a highly-efficient power supply to a load, regardless of a power supply amount of to a load.

Solution to Problem

To attain the above object, the DC-DC converter relevant to the present invention is characterized by a full bridge circuit, composed of a first switching leg connecting a first and a second switching elements in series, and a second switching leg connecting a third and a fourth switching elements in series, the first and second switching legs being connected in parallel, wherein DC terminals are provided between both ends of the first switching leg and between both ends of the second switching leg, and AC terminals are provided between the series connecting point of the first and the second switching elements, and the series connecting point of the third and the fourth switching elements; a rectifier circuit having a smoothing reactor; a first smoothing capacitor connected to a DC power source in parallel and connected to the DC terminals of the full bridge circuit; a second smoothing capacitor connected to a load in parallel, and connected to a DC terminals of the rectifier circuit; a primary winding connected to the AC terminals of the full bridge circuit; a secondary winding connected to an AC terminals of the rectifier circuit; a transformer for connecting magnetically the primary winding and the secondary winding; and a control means for controlling the full bridge circuit, wherein the first, second, third and fourth switching elements are each composed of a switch, an antiparallel diode connected to the switch in parallel, and a capacitor connected to the switch and the antiparallel diode in parallel, the DC-DC converter having a reactor component inserted between the AC terminals and the primary winding of the full bridge circuit in series; when power supply amount to the load is predetermined value or more, the control means implements a first mode for making the first, the second, the third and the fourth switching elements driven; and when power supply amount to the load is predetermined value or less, the control means implements a second mode for making one set of the switching elements of the switching leg at one side composing the first switching leg and the second switching leg stopped, in an OFF state, and for making one set of the switching elements of the switching leg at the other side composing the first switching leg and the second switching leg driven.

In addition, a vehicle relevant to the present invention is characterized by mounting the DC-DC converter of the present invention.

Advantageous Effects of Invention

According to the present invention, regardless of a power supply amount of to a load, a highly-efficient DC-DC converter can be provided.

According to the present invention, regardless of a power supply amount of to a load, a vehicle, which enables a highly-efficient power supply to a load, can be provided.

DESCRIPTION OF EMBODIMENTS

Explanation will be given in detail on embodiments of the present invention with reference to drawings. It should be noted that, in the following explanation, voltage of the switching element in an ON-state, or voltage nearly equivalent to or lower than forward voltage drop of a antiparallel diode connected to the switching element in parallel, is called zero voltage, and it is called zero voltage switching or soft switching to decrease switching loss by switching ON and OFF of this switching element, in a state that voltage applied to the switching element is zero voltage.

Embodiment 1

Figure 1:
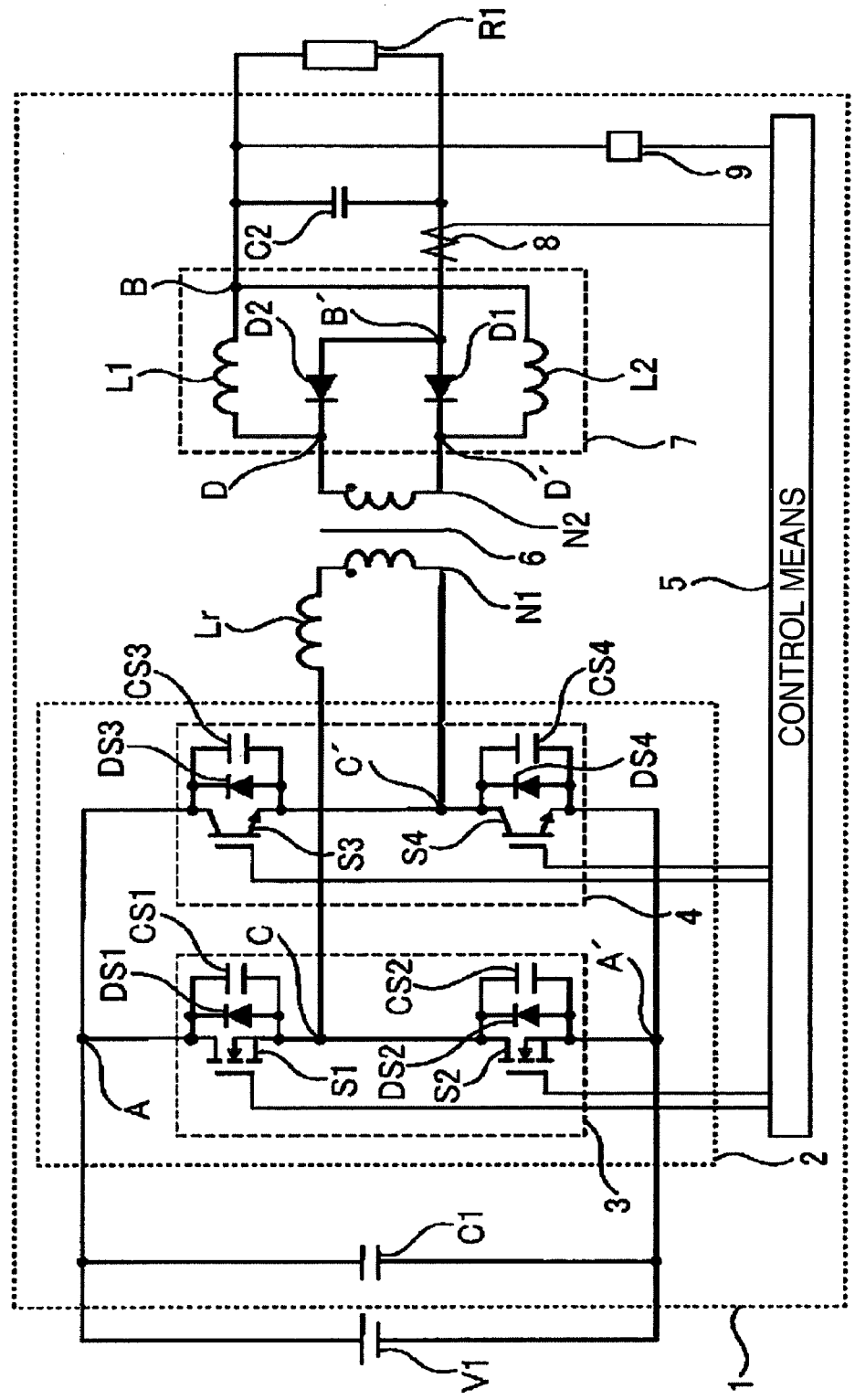
FIG. 1 is a circuit configuration diagram of the DC-DC converter according to Embodiment 1 of the present invention.

FIG. 1 is a circuit configuration diagram of the DC-DC converter 1 according to Embodiment 1 of the present invention. This DC-DC converter 1 supplies power to a load R1, by transforming the voltage of a DC power source V1. It should be noted that the DC power source V1 may be substituted with output of other converter of a power factor correction circuit or the like.

In FIG. 1, the DC power source V1 and a smoothing capacitor C1 are connected between DC terminals A-A' of a full bridge circuit 2. A smoothing capacitor C2 and the load R1 are connected between DC terminals B-B of a rectifier circuit 7. A primary winding N1 is connected between AC terminals C-C' of full bridge circuit 2, and a secondary winding N2 is connected between AC terminals D-D' of the rectifier circuit 7. This primary winding N1 and secondary winding N2 are magnetically connected by a transformer 6. The full bridge circuit 2 is composed of a first switching leg 3 connected a first switching element S1 and a second switching element S2 in series, and a second switching leg 4 connected a third switching element S3 and a fourth switching element S4 in series.

To switching elements S1 to S4, antiparallel diodes DS1 to DS4 are connected, respectively. Here, in the case of using MOSFET as these switching elements, a body diode of MOSFET can be utilized as the antiparallel diode. In addition, the switching elements S1 to S4 have parasitic capacitance CS1 to CS4. In this case, a snubber capacitor may be connected to the switching elements S1 to S4 in parallel, as a capacitor. In FIG. 1, as one embodiment, MOSFET is used as the switching elements S1 and S2, and IGBT is used as the switching elements S3 and S4. A reactor Lr is inserted in series between the AC terminals and the primary winding N1 of the full bridge circuit 2. Here, as the reactor Lr, a leak inductance of the transformer 6 may be utilized.

A rectifier circuit 7 is composed of two smoothing reactors L1 and L2 and two diodes D1 and D2. At one end of the secondary winding N2, one end of the smoothing reactor L1 and a cathode of the diode D2 are connected, and at the other end of the secondary winding N2, one end of the smoothing reactor L2 and a cathode of the diode D1 are connected. The other end of the smoothing reactor L1 and L2 is connected to one end of the smoothing capacitor C2, and an anode of the diode D1 and D2 is connected to the other end of the smoothing capacitor C2. Here, the switching element may be used instead of the diode D1 and D2. In this case, adoption of a synchronous rectification system enables to further enhance efficiency of the DC-DC converter 1.

The DC-DC converter 1 of the present invention is characterized by switching an operating mode of the switching element in response to power supply amount to the load R1. Explanation will be given below on switching of an operating mode with reference to FIG. 2.

Figure 2:
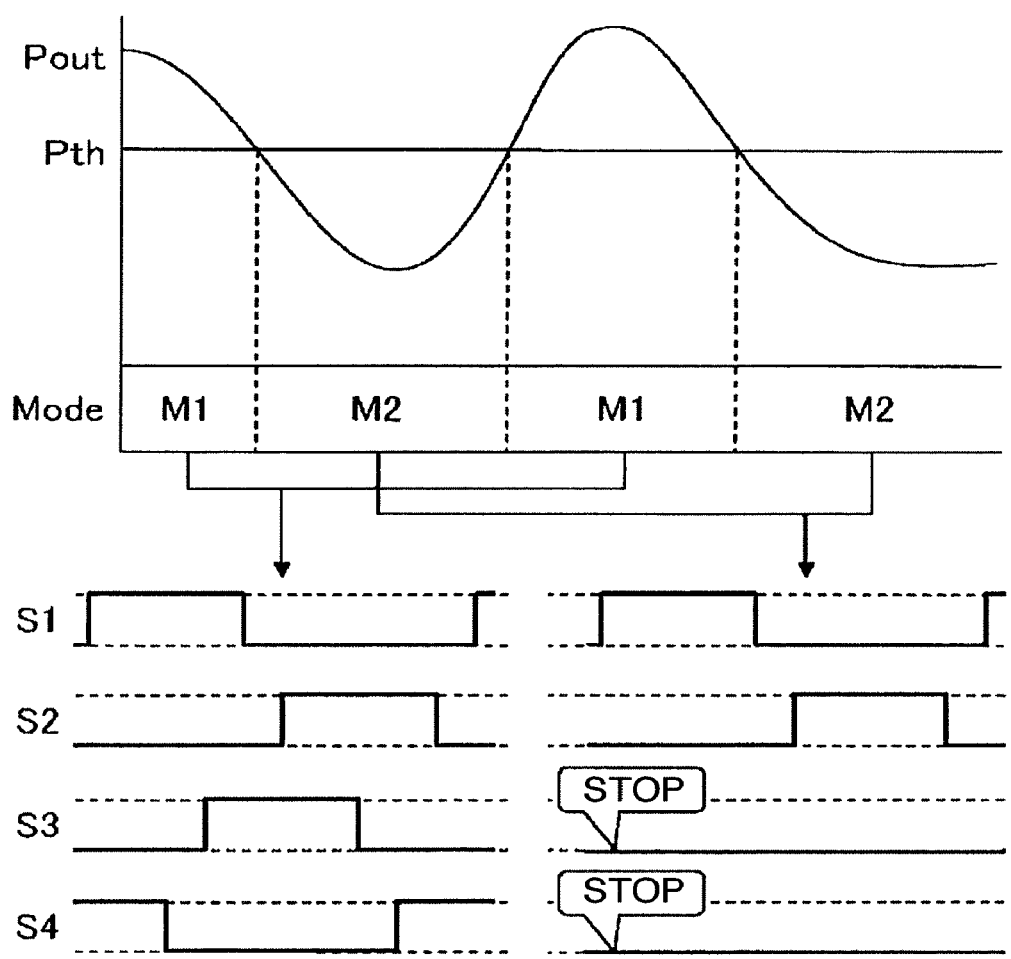
FIG. 2 is a drawing explaining the switching of operating mode of Embodiment 1.

FIG. 2 is a drawing explaining the switching of operating mode. Output power Pout is a product of output current detected by a current sensor 8, and output voltage detected by a voltage sensor 9. Pth is a predetermined value set to switch the operating mode. In the case where output power Pout is predetermined value Pth or more, the control means 5 drives the switching elements S1 to S4, as the heavy load mode M1, which is the first mode. In this case, when the switching elements S1 to S4 are driven by the phase shift system, zero voltage switching is possible. When output power Pout becomes predetermined value Pth or less, it is transferred to the light load mode M2, which is the second mode. The control means 5 makes the switching elements S3 and S4 stopped in an OFF state, and drives only the switching elements S1 and S2. The control means 5 controls output power by controlling drive frequency of the switching elements S1 and S2. It should be noted that, in the same drawing, a drive signal for driving the switching elements S1 to S4 is described at the lower stage of the graph, and the High side represents an ON-signal and the Low side represents an OFF-signal.

Figure 3:
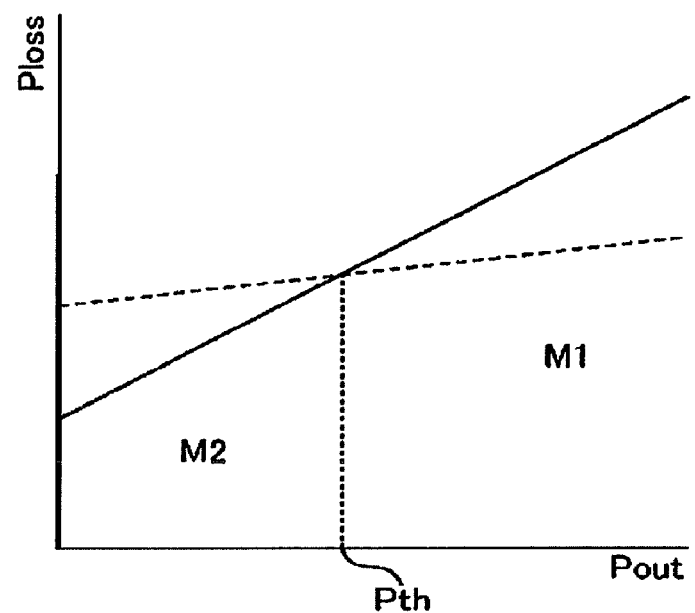
FIG. 3 is a drawing explaining a determination method for a predetermined value Pth of Embodiment 1.

FIG. 3 is a drawing explaining a determination method for a predetermined value Pth. A Ploss-Pout straight line shown by a dotted line shows loss in each output power Pout actuated by the heavy load mode M1, and the Ploss-Pout straight line shown by a solid line shows loss in each output power Pout actuated by the light load mode M2. In this way, the predetermined value Pth may be determined by size of the output power Pout, so that loss Ploss selects the smaller operating modes M1 and M2. Theoretically, by setting a cross-point of the dotted line and the solid line as Pth, the best efficiency is obtained. Naturally, the predetermined value Pth may be set arbitrarily.

Figure 4:
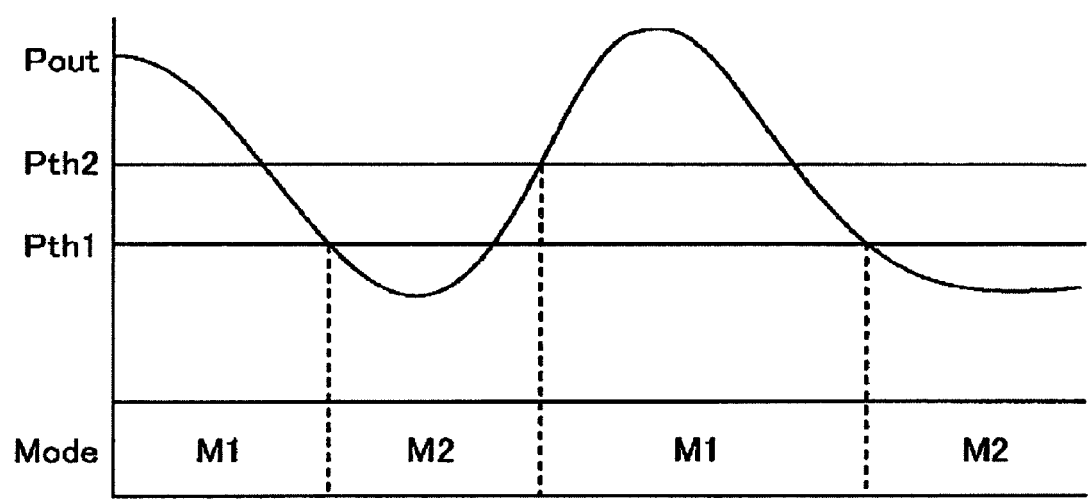
FIG. 4 is a drawing explaining the switching of operating mode based on two predetermined values Pth1 and 2 of Embodiment 1.

Here, when output power Pout is nearly the same value as predetermined value Pth, there may be frequent switching between the heavy load mode M1 and the light load mode M2. In such a case, as shown in FIG. 4, by determining each the predetermined value Pth1 for switching from the heavy load mode M1 to the light load mode M2, and the predetermined value Pth2 for switching from the light load mode M2 to the heavy load mode M1, there may be the case where the problem can be solved. Difference between the predetermined values Pth1 and Pth2 may be selected and determined in view of balance between efficiency and switching frequency, depending on a product applying the present technology.

Figure 5:
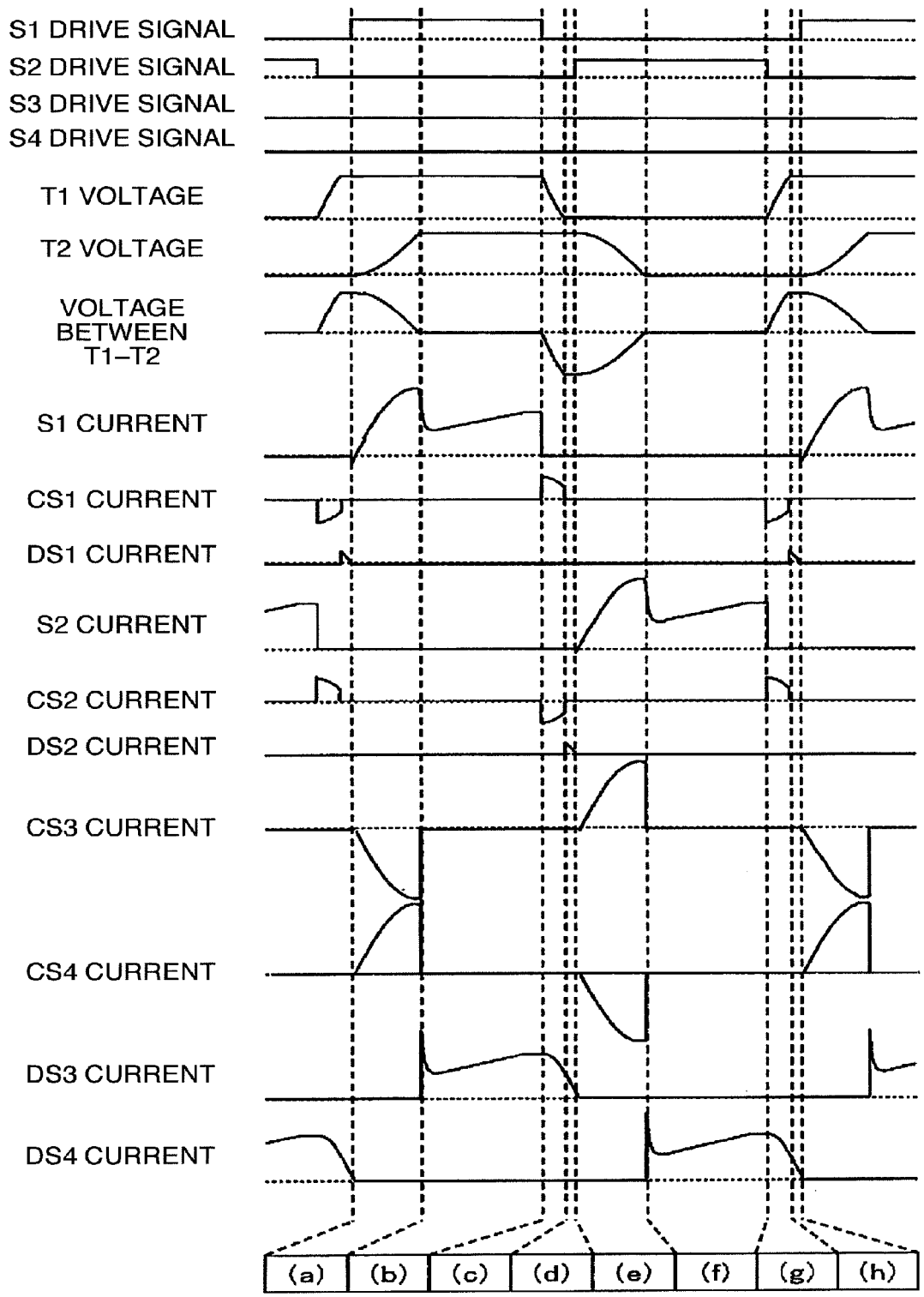
FIG. 5 is a drawing of a voltage-current waveform explaining an operation in a light load mode M2 of Embodiment 1.

Next, explanation will be given on circuit operation in the light load mode M2 of the DC-DC converter 1 with reference to FIG. 5 to FIG. 13. Circuit operation of the heavy load mode M1 is omitted because a conventional phase shift system can be applied. FIG. 5 is a drawing of a voltage/current waveform explaining the operation in a light load mode M2 of the DC-DC converter 1. In addition, explanation will be given firstly on a voltage waveform in FIG. 5. An S1 drive signal to an S4 drive signal represent a drive signal waveform which the control means 5 outputs to the switching elements S1 to S4, respectively. Also in the same drawing, the switching elements S1 to S4 are made ON, when the drive signal waveform to be output to the switching elements S1 to S4 becomes High, and are made OFF, when it becomes Low. T1 voltage represents a waveform of voltage of the node T1 at one end side of the primary winding N1, and T2 voltage represents a waveform of voltage of the node T2 at the other end side of the primary winding N1. Voltage between T1-T2 represents a voltage waveform where T2 voltage is subtracted from T1 voltage. Explanation will be given next on a current waveform in FIG. 5. S1 current and S2 current represent current between drain-source of the switching elements S1 and S2, respectively. CS1 current to CS4 current represent a current waveform flowing the parasitic capacitance CS1 to CS4, respectively. As for CS1 current to CS4 current, positive current is called charge current, and negative current is called discharge current, provided that flow direction from one end of the parasitic capacitance connected to a drain of the switching element to the other end of the parasitic capacitance connected to a source of the switching element is positive. DS1 current to DS4 current represent a current waveform flowing the antiparallel diodes DS1 to DS4, respectively. In DS1 current to DS4 current, a direction flowing from an anode to a cathode is set to be positive, in antiparallel diodes DS1 to DS4, respectively. It should be noted that periods (a) to (h) partitioned by each dotted line in FIG. 5 correspond to the (mode a) to the (mode h), to be explained below, respectively. In the light load mode M2, drive signals of the switching elements S3 and S4 become OFF over all modes of the (mode a) to the (mode h).

(Mode a)

Figure 6:
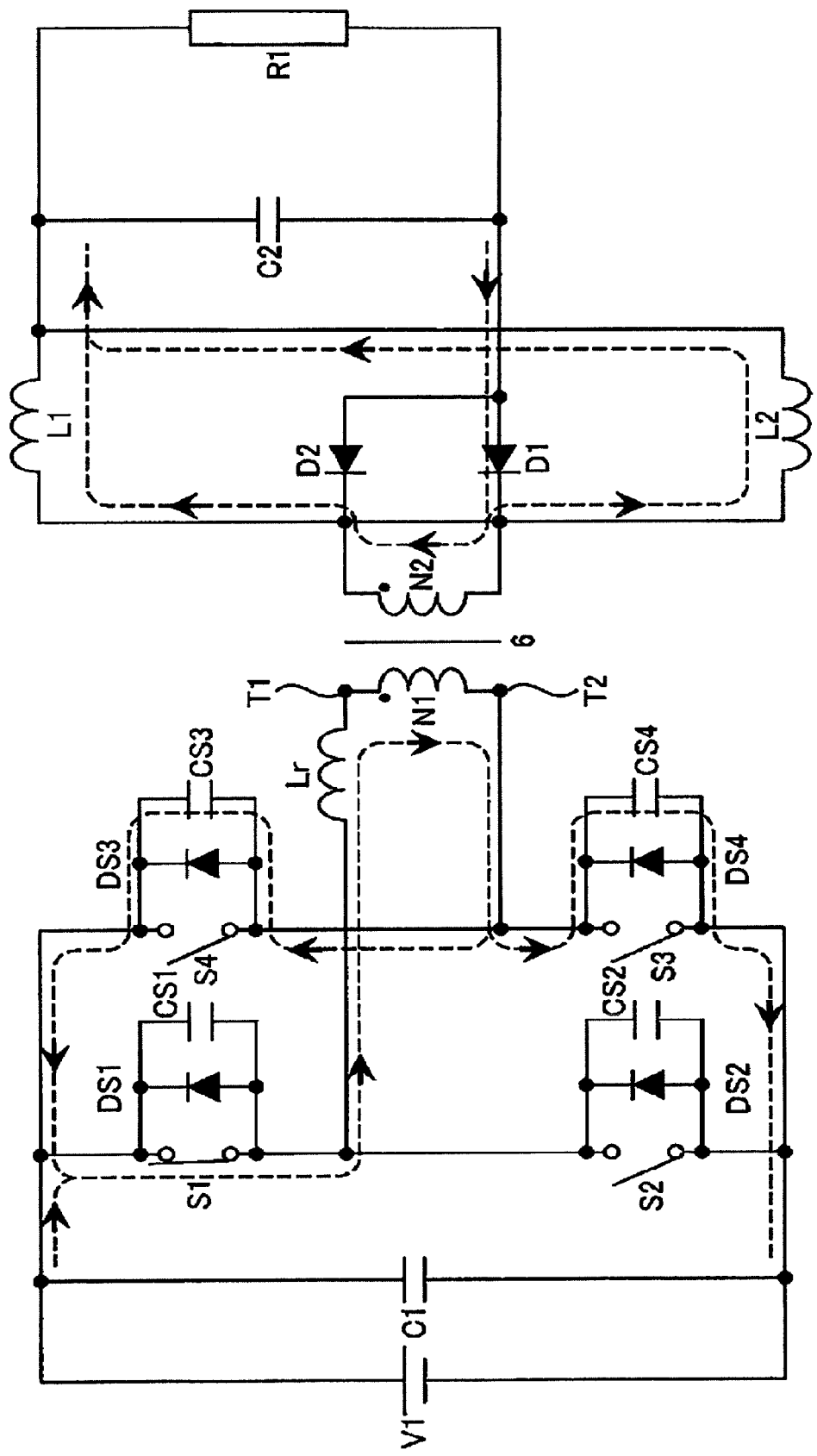
FIG. 6 is a circuit diagram explaining an operation (mode a) in a light load mode M2 in the period (a) shown in FIG. 5.

FIG. 6 is a circuit diagram explaining an operation (mode a) in a light load mode M2 in the period (a) shown in FIG. 5. The switching element S1 is turned-ON. Voltage between the both ends of the switching element S1 is zero voltage due to conduction of the antiparallel diode DS1, and thus the switching element S1 becomes zero voltage switching. After that, when current flowing the reactor Lr comes up to zero, reverse recovery current flows, which is current till reverse recovery to the antiparallel diode DS4, and current flowing the reactor Lr increases in a positive direction. After that, when the antiparallel diode DS4 attains reverse recovery, current flowing the switching element S1 becomes charge current of the parasitic capacitance CS4 and discharge current of the parasitic capacitance CS3.

(Mode b)

Figure 7:
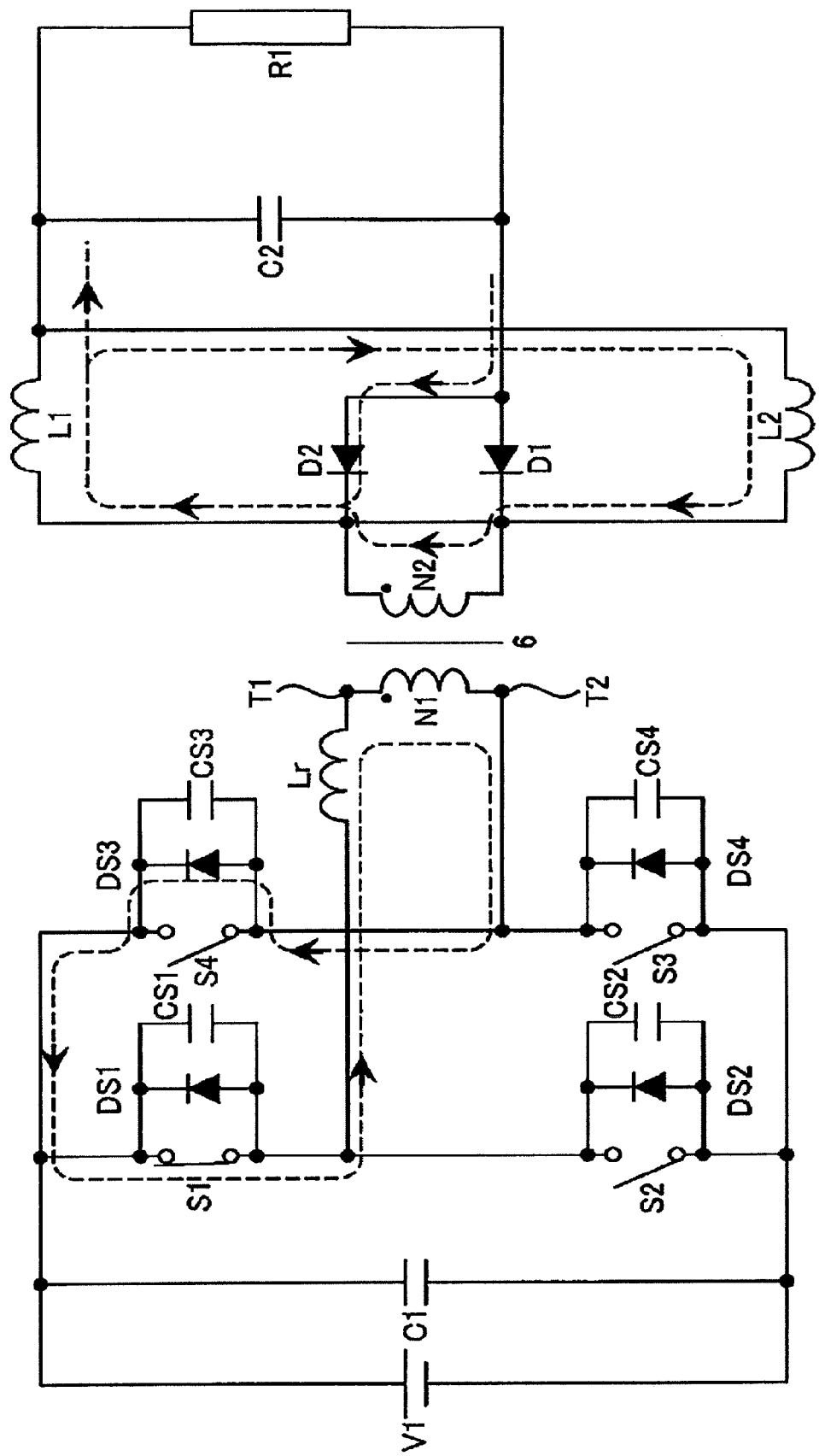
FIG. 7 is a circuit diagram explaining an operation (mode b) in a light load mode M2 in the period (b) shown in FIG. 5.

FIG. 7 is a circuit diagram explaining an operation (mode b) in a light load mode M2 in the period (b) shown in FIG. 5. Discharge of the parasitic capacitance CS3 decreases both ends voltage of the antiparallel diode DS3, and crossing the zero voltage conducts the antiparallel diode DS3. Conduction of the antiparallel diode DS3 inhibits flow of discharge current of the parasitic capacitance CS3 and charge current of the parasitic capacitance CS4. Current flowed the antiparallel diode DS3 returns to the antiparallel diode DS3 through the switching element S1, the reactor Lr and the primary winding N1. Current flowing this route increases gradually.

(Mode c)

Figure 8:
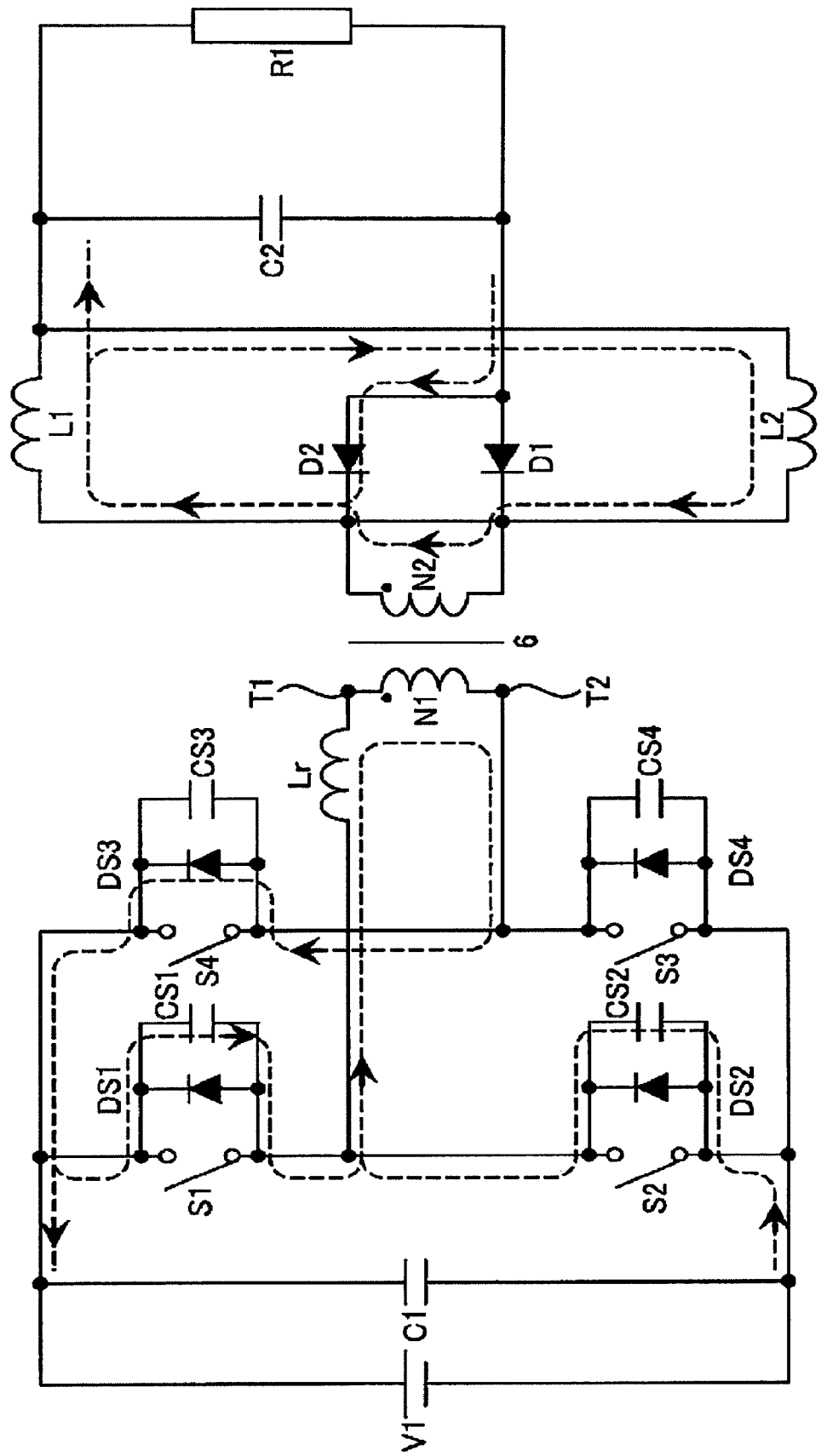
FIG. 8 is a circuit diagram explaining an operation (mode c) in a light load mode M2 in the period (c) shown in FIG. 5.

FIG. 8 is a circuit diagram explaining an operation (mode c) in a light load mode M2 in the period (c) shown in FIG. 5. The switching element S1 is turned-OFF. Current flowing the antiparallel diode DS3 becomes charge current to the parasitic capacitance CS1 and discharge current of the parasitic capacitance CS2. Discharge of the parasitic capacitance CS2 decreases voltage of the node T1, however, voltage of the node T2 maintains higher voltage than the DC voltage V1 due to conduction of the antiparallel diode DS3. In this way, voltage between the node T1 and the node T2 enlarges in a negative direction.

(Mode d)

Figure 9:
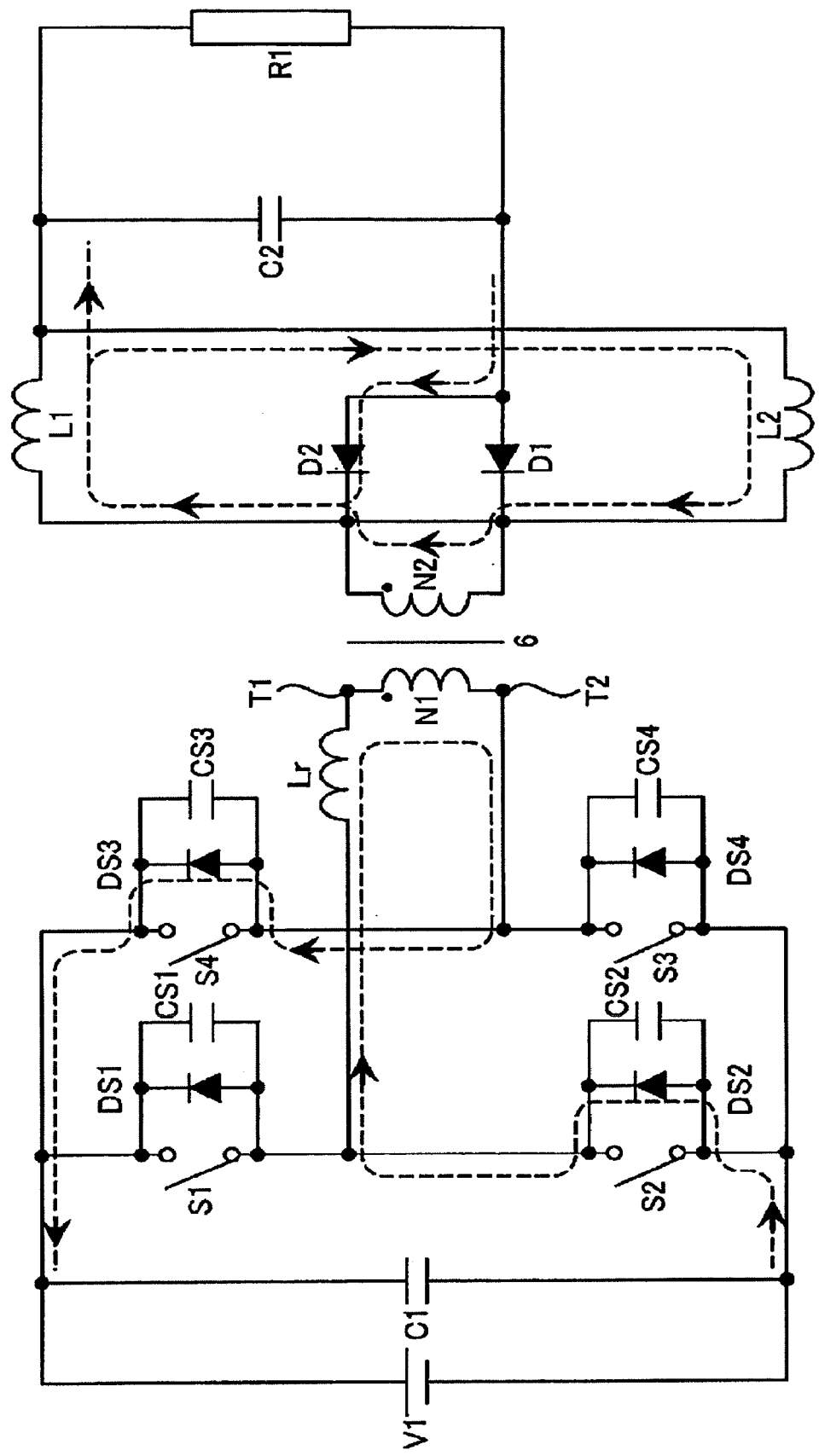
FIG. 9 is a circuit diagram explaining an operation (mode d) in a light load mode M2 in the period (d) shown in FIG. 5.

FIG. 9 is a circuit diagram explaining an operation (mode d) in a light load mode M2 in the period (d) shown in FIG. 5. Discharge of the parasitic capacitance CS2 decreases both ends voltage of the antiparallel diode DS2, and crossing the zero voltage conducts the antiparallel diode DS2. Conduction of the antiparallel diode DS2 inhibits flow of discharge current of the parasitic capacitance CS2 and charge current of the parasitic capacitance CS1. Current flowed the antiparallel diode DS2 returns to the antiparallel diode DS2 through the reactor Lr and the primary winding N1. Current flowing this route increases gradually.

(Mode e)

Figure 10:
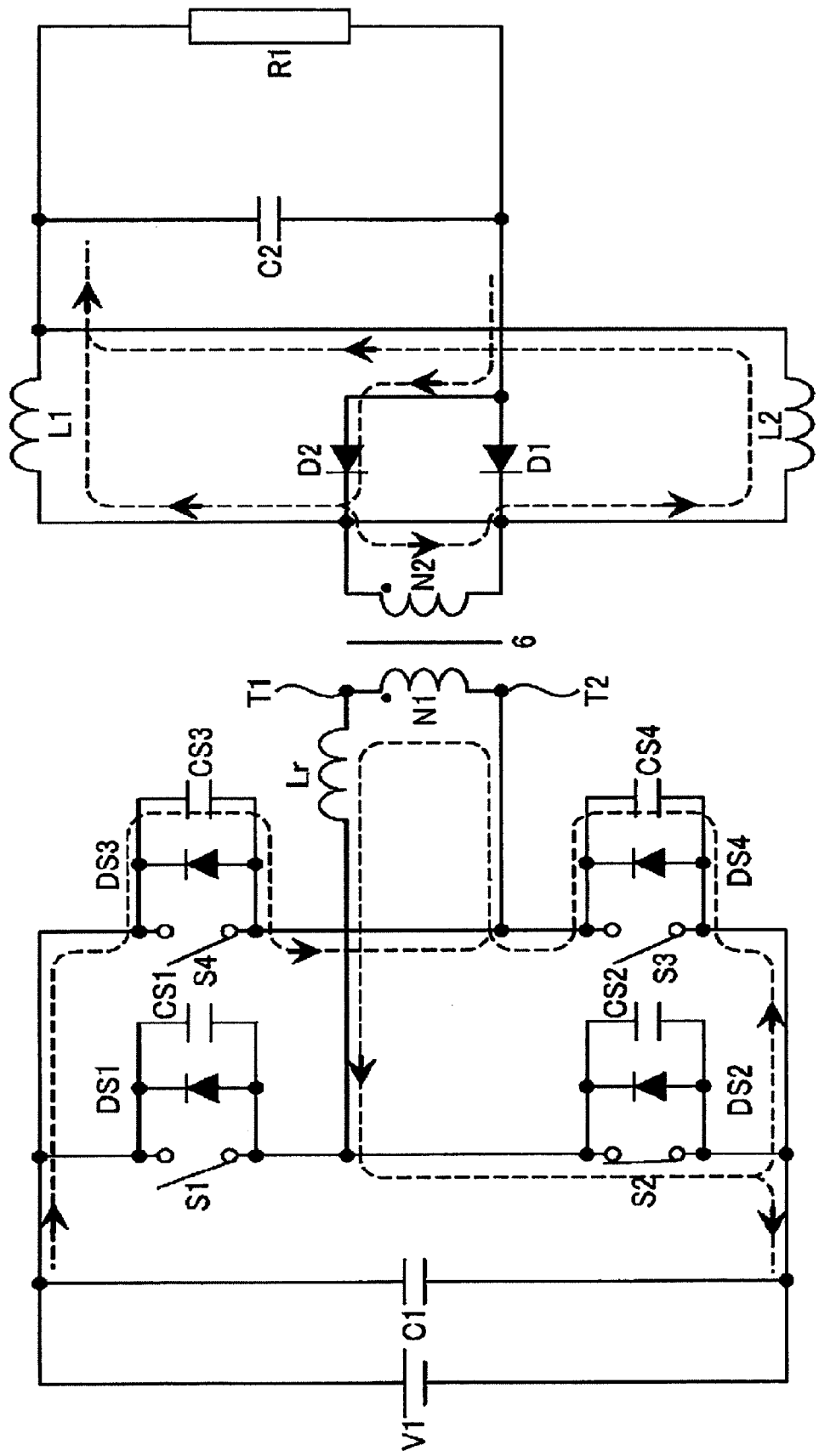
FIG. 10 is a circuit diagram explaining an operation (mode e) in a light load mode M2 in the period (e) shown in FIG. 5.

FIG. 10 is a circuit diagram explaining an operation (mode e) in a light load mode M2 in the period (e) shown in FIG. 5. The switching element S2 is turned-ON. Voltage between the both ends of the switching element S2 is zero voltage due to conduction of the antiparallel diode DS2, and thus the switching element S2 becomes zero voltage switching. After that, when current flowing the reactor Lr comes up to zero, reverse recovery current flows, which is current till reverse recovery to the antiparallel diode DS3, and current flowing the reactor Lr increases in a negative direction. After that, when the antiparallel diode DS3 attains reverse recovery, current flowing the switching element S2 becomes charge current of the parasitic capacitance CS3 and discharge current of the parasitic capacitance CS4. Voltage of the node T2 decreases by discharge of the parasitic capacitance CS4, however, voltage of the node T1 maintains zero voltage due to conduction of the switching element S2. In this way, voltage between the node T1 and the node T2 approaches to zero.

(Mode f)

Figure 11:
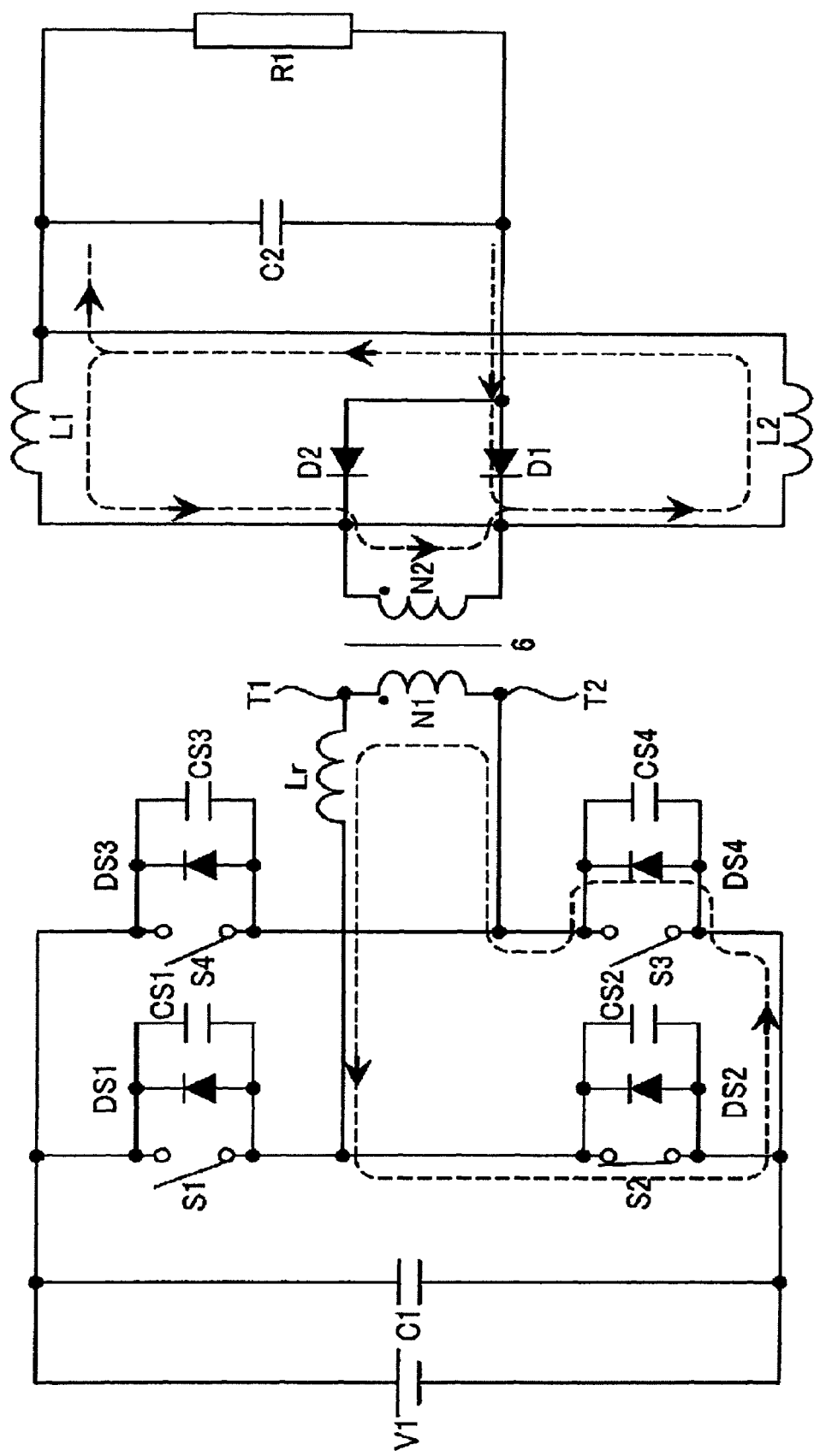
FIG. 11 is a circuit diagram explaining an operation (mode f) in a light load mode M2 in the period (f) shown in FIG. 5.

FIG. 11 is a circuit diagram explaining an operation (mode f) in a light load mode M2 in the period (f) shown in FIG. 5. Discharge of the parasitic capacitance CS4 decreases both ends voltage of the antiparallel diode DS4, and crossing the zero voltage conducts the antiparallel diode DS4. Conduction of the antiparallel diode DS4 inhibits flow of discharge current of the parasitic capacitance CS4 and charge current of the parasitic capacitance CS3. Current flowed the antiparallel diode DS4 returns to the antiparallel diode DS4 through the primary winding N1, the reactor Lr and the switching element S2. Current flowing this route increases gradually.

(Mode g)

Figure 12:
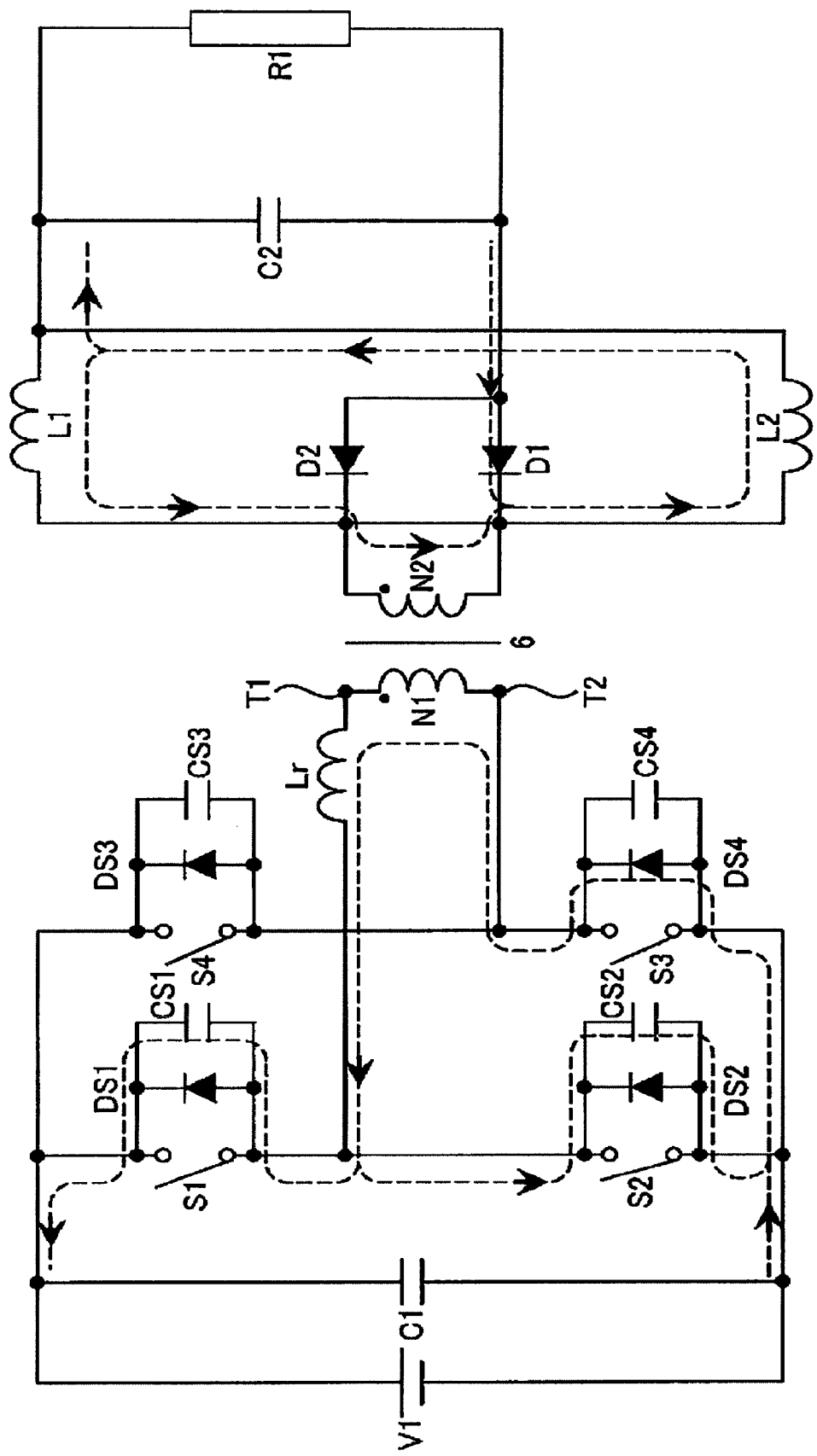
FIG. 12 is a circuit diagram explaining an operation (mode g) in a light load mode M2 in the period (g) shown in FIG. 5.

FIG. 12 is a circuit diagram explaining an operation (mode g) in a light load mode M2 in the period (g) shown in FIG. 5. The switching element S2 is turned-ON. Current flowing the switching element S2 becomes discharge current of the parasitic capacitance CS1 and charge current of the parasitic capacitance CS2. Charge of the parasitic capacitance CS2 increases voltage of the node T1, however, voltage of the node T2 maintains zero voltage due to conduction of the antiparallel diode D4. In this way, voltage between the node T1 and the node T2 increases in a positive direction.

(Mode h)

Figure 13:
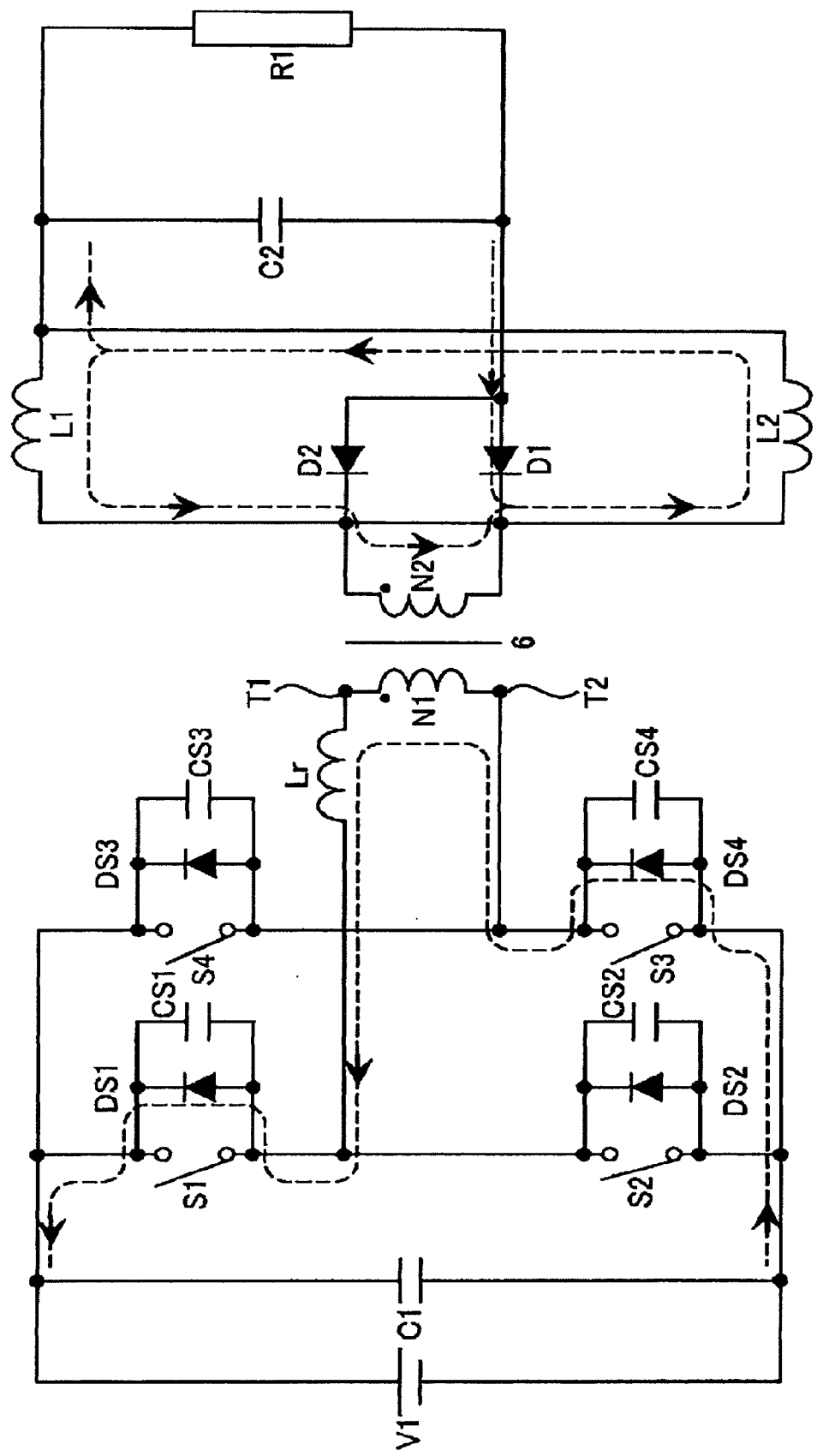
FIG. 13 is a circuit diagram explaining an operation (mode h) in a light load mode M2 in the period (h) shown in FIG. 5.

FIG. 13 is a circuit diagram explaining an operation (mode h) in a light load mode M2 in the period (h) shown in FIG. 5. Discharge of the parasitic capacitance CS1 decreases both ends voltage of the antiparallel diode DS1, and crossing the zero voltage conducts the antiparallel diode DS1. Conduction of the antiparallel diode DS1 inhibits flow of discharge current of the parasitic capacitance CS1 and charge current of the parasitic capacitance CS2. Current flowed the antiparallel diode DS1 returns to the antiparallel diode DS1 through the antiparallel diode DS4, the primary winding N1 and the reactor Lr. Current flowing this route decreases gradually.

Hereafter, by returning to the (mode a), operation of the above (mode a) to (mode h) is repeated.

It should be noted that, in the (mode a) to the (mode h), there is a mode where current flowing in the smoothing reactor L1 and L2 flows reversely, however, it can also be avoided by increasing a reactor value, by changing winding number ratio of the primary winding N1 and N2, or the like.

Reason for enabling control of the output power by controlling drive frequency of the switching elements S1 and S2, is because a time period when a voltage is generated between the node T1 and the node T2 is changed. That is, by increasing the drive frequency, an effective value of the voltage between the node T1 and the node T2 per one cycle increases, and thus the output power can be increased. On the contrary, by decreasing the drive frequency, the output power also decreases. To increase the output power without increasing the drive frequency, adoption of a switching element having a large parasitic capacitance, as the switching elements S3 and S4, is preferable because of enabling to extend the period when the voltage is generated between both ends of a transformer. In addition, a snubber capacitor may be connected to the switching elements S3 and S4 in parallel. It is because the addition of charge-discharge period of the snubber capacitor in the (mode a) and the (mode e) results in extending the period when the voltage is generated between the node T1 and the node T2. As other method for increasing the output power without increasing the drive frequency, a diode having slow reverse recovery characteristics can be adopted as the antiparallel diodes DS3 and dS4. In the (mode d) and the (mode h), the voltage between the node T1 and the node T2 is maintained till completion of reverse recovery of the antiparallel diodes DS3 and DS4. Accordingly, the output voltage can be increased.

Use of a switching element having fast switching characteristics as the switching elements S1 and S2 may sometimes enhance efficiency. Generally, a MOSFET has fast switching characteristics and small switching loss. In addition, an LGBT has small on-resistance and small conduction loss. For example, the MOSFET is used as the switching elements S1 and S2, and the IGBT is used as the switching elements S3 and S4. In this way, switching loss in the light load mode M2 can also be decreased while suppressing conduction loss in the heavy load mode M1.

Figure 14:
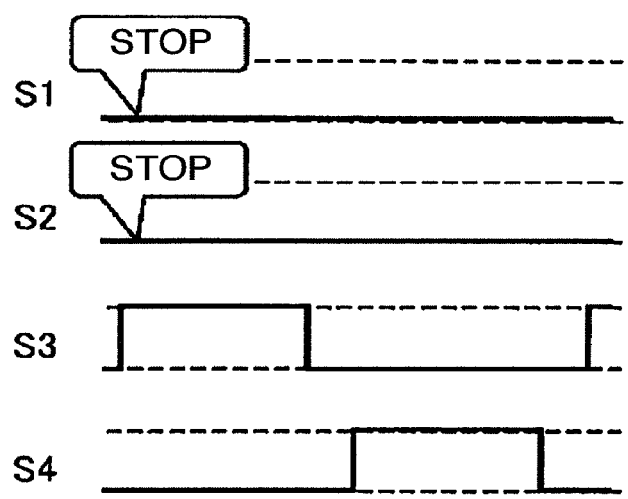
FIG. 14 is a drawing of a voltage waveform explaining other operation in a light load mode M2 of Embodiment 1.

On the contrary, use of the IGBT as the switching elements S1 and S2, and the MOSFET as the switching elements S3 and S4 enables to increase the output power. Generally, a body diode of MOSFET has slow reverse recovery characteristics. Utilization of the body diode of MOSFET to the antiparallel diodes DS3 and DS4 enables to maintain voltage between the node T1 and the node T2 till completion of reverse recovery of the antiparallel diodes DS3 and DS4, in the (mode e) and the (mode a). Accordingly, output voltage can be increased. It should be noted that it is clear that, also in the case of using MOSFET as the switching elements S1 and S2, and IGBT as the switching elements S3 and S4, as shown in FIG. 14, by making the switching elements S1 and S2 stopped in an OFF state, and by making only the switching elements S3 and S4 driven, similar effect to in the DC-DC converter having a configuration using IGBT as the switching elements S1 and S2, and MOSFET as the switching elements S3 and S4, can be obtained. In addition, on the contrary, also in the case of using IGBT as the switching elements S1 and S2, and MOSFET as the switching elements S3 and S4, as shown in FIG. 14, by making the switching elements S1 and S2 stopped in an OFF state, and by making only the switching elements S3 and S4 driven, it is clear that similar effect to in the DC-DC converter having a configuration using MOSFET as the switching elements S1 and S2, and IGBT as the switching elements S3 and S4, can be obtained.

As described above, the DC-DC converter 1 of the present invention is characterized in that, zero voltage switching becomes easy to be realized, even in the light load. However, when power supply amount to the load is considered to be nearly zero, a current required for charge-discharge of the parasitic capacitance CS1 to CS4 cannot be secured, which may sometimes provide a case that the switching elements S1 and S2 become hard switching. However, in this case, a drive frequency of the switching elements S1 and S2 is lower as compared with a drive frequency in the heavy load mode M1. Therefore, it can be said that the present invention is effective, because even when power supply amount to the load appears nearly zero, the light load mode M2 has higher efficiency than the heavy load mode M1.

In addition, in the above PATENT LITERATURE 2, a resonant type circuit having operation principle different from that of the phase shift type is shown. In the resonant type circuit, the frequency range should be limited for stable operation. Also, many limitations in input voltage range and variation range of output voltage. In addition, it requires having operation frequency apart from resonance frequency to turn down the output because the resonant circuit is a frequency controlled circuit. Therefore, it causes increase in ripple, requires bigger power to drive the elements, and thus making higher efficiency is difficult to attain.

On the contrary, in a circuit of the phase shift type, the operation is implemented by utilization of conduction of a diode connected to these switching elements in parallel or charge-discharge to the parasitic capacitance, in addition to ON/FF of the switching element. And, in order to improve efficiency, it is important how to realize zero voltage switching or switching near thereto, in performing ON/FF of the switching element. Therefore, it is important that the charge-discharge to the parasitic capacitance is controlled.

Conventionally, in the light load, because sufficient current does not flow in a circuit, output capacity of a switch is not charged-discharged sufficiently, providing hard switching, thus incurring deterioration of efficiency. However, in the present Embodiment, this problem is eliminated by making operation of one switching legs composed of one set of switching elements connected in series in the full bridge circuit stopped in the case of light load. After confirming a current state flowing in the circuit in such a state, it was confirmed that the current for charge-discharge of the output capacity of a switch in the light load has increased, as compared with conventional control, although the reason for that has not yet been clarified. In this way, charge-discharge of the output capacity of a switch is prompted, even in the light load, making soft switching possible.

That is, according to the present Embodiment, the turn-on of the switch becomes possible by lower voltage, and switching loss decreases, as compared with a conventional control method. In addition, according to the present Embodiment, the output is more easily turned down due to low frequency, as well as because of making operation of one set of the switching elements connected in series composing one switching legs stopped, drive loss in theses switches can also be suppressed, and thus further enhancement of efficiency can be attained, as compared with a conventional control method.

Embodiment 2

Figure 15:
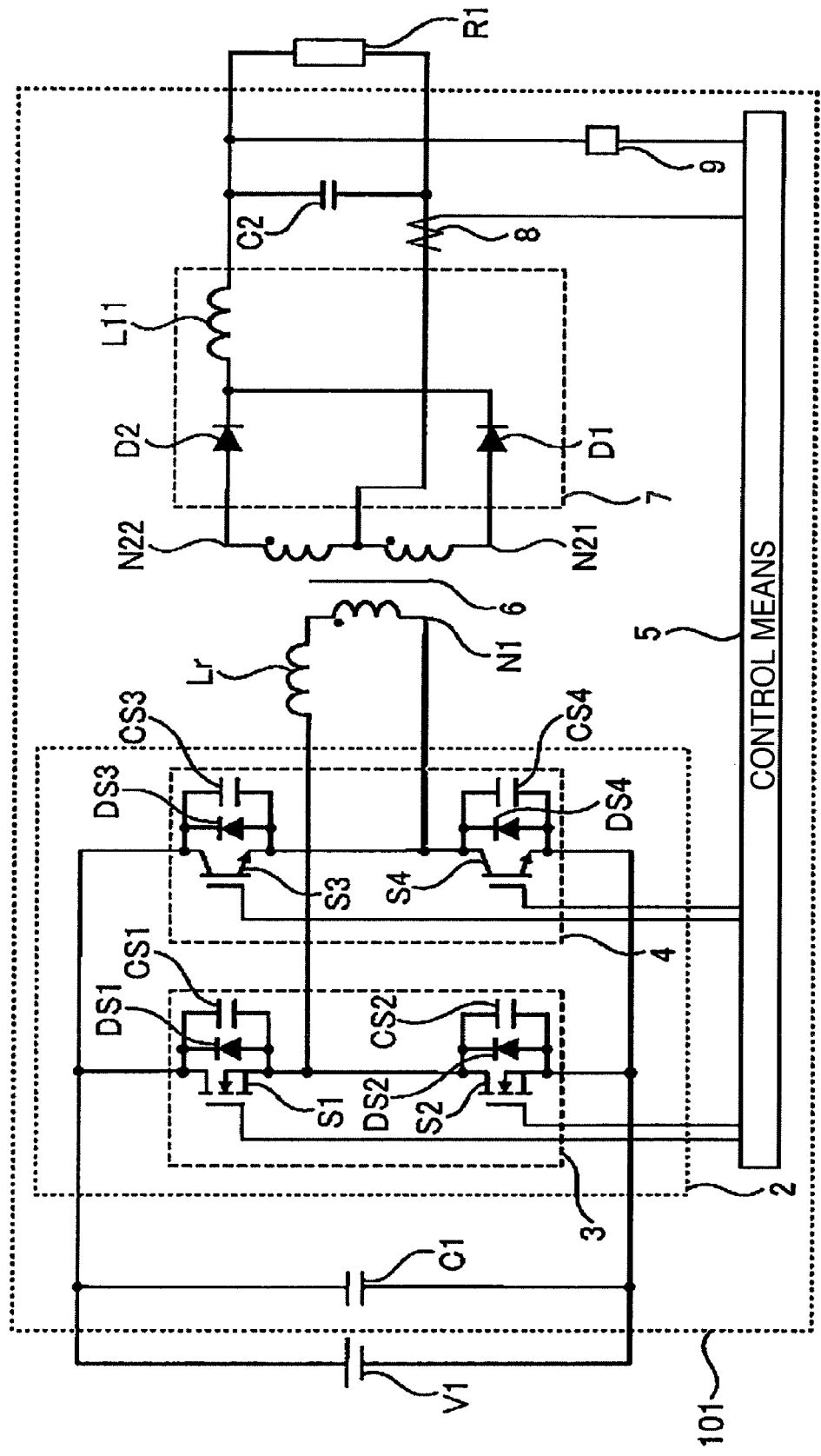
FIG. 15 is a circuit configuration diagram of the DC-DC converter according to Embodiment 2 of the present invention.

FIG. 15 is a circuit configuration diagram of the DC-DC converter 101 according to Embodiment 2 of the present invention. The same reference signs will be furnished to the same parts as in FIG. 1, and explanation thereof is omitted. The rectifier circuit 7 is composed of the smoothing reactor L11 and the two diodes D1 and D2. One end of the smoothing reactor L11 is connected to the diodes D1 and D2, and the other end of the smoothing reactor L11 is connected to one end of the smoothing capacitor C2. Two secondary winding N21 and N22 are connected mutually at one end thereof, and the connecting point thereof is connected to the other end of the smoothing capacitor C2. As for other end of the secondary winding N21 and N22, N21 and N22 are connected to the anode of the diode D1 and the anode of the diode D2, respectively. In this way, the smoothing reactor can be reduced, by which parts number can be reduced and cost can be decreased, as compared with Embodiment 1. In addition, by using the switching element instead of the diodes D1 and D2, and by using a synchronous rectifying system, further higher efficiency can be attained.

Embodiment 3

Figure 16:
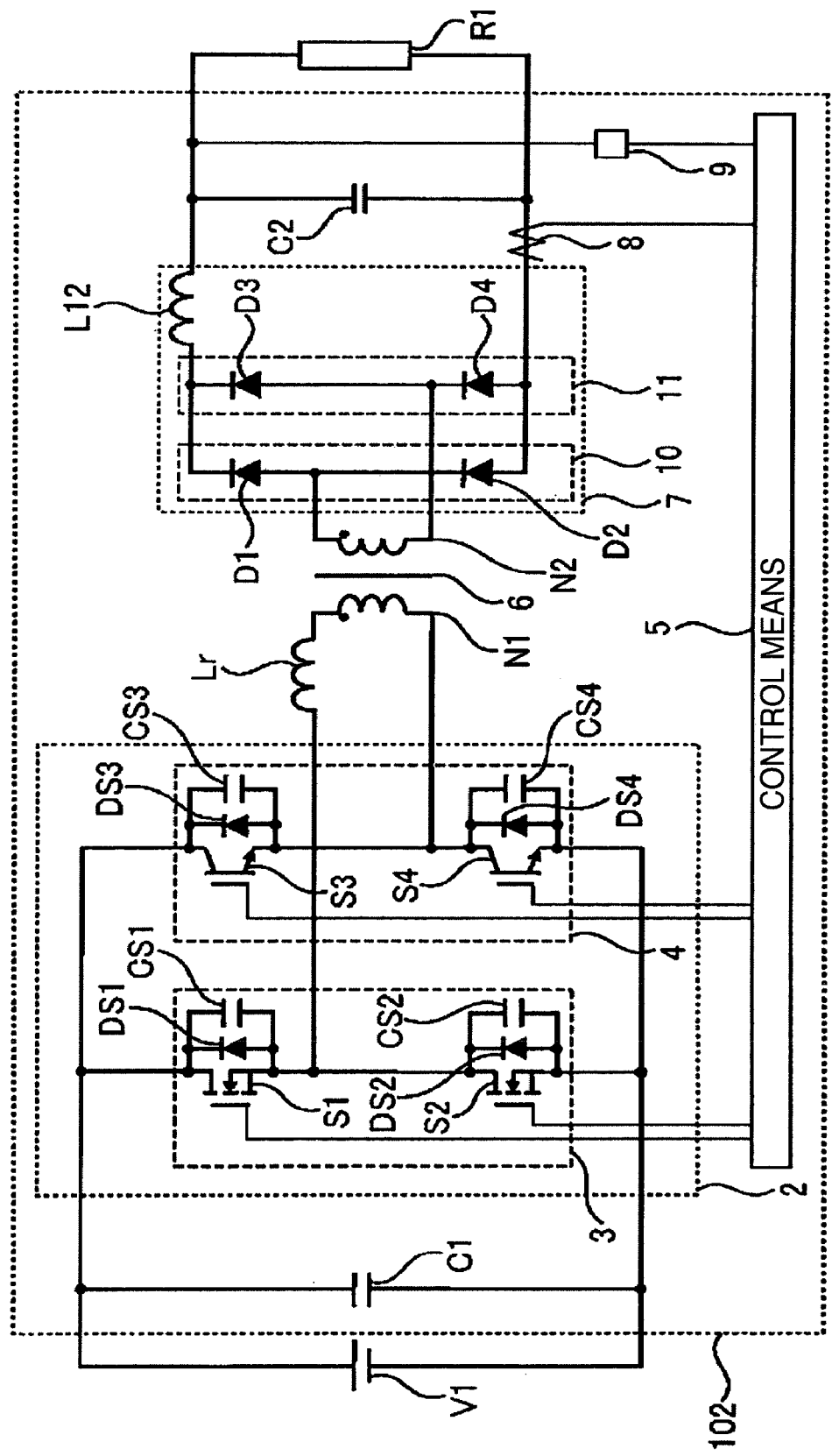
FIG. 16 is a circuit configuration diagram of the DC-DC converter according to Embodiment 3 of the present invention.

FIG. 16 is a circuit configuration diagram of the DC-DC converter 102 according to Embodiment 3 of the present invention. The same reference signs will be furnished to the same parts as in FIG. 1, and explanation thereof is omitted. The rectifier circuit 7 is composed of the smoothing reactor L12, the diode leg 10 connected the diodes D1 and D2 in series, and the diode leg 11 connected the diodes D3 and D4 in series and connected to the diode leg 10 in parallel. One end of the smoothing reactor L12 is connected to one end of the diode leg 10, the other end of the smoothing reactor L12 is connected to one end of the smoothing capacitor C2, and the other end of the diode leg 10 is connected to the other end of the smoothing capacitor C2. The connecting point the diodes D1 and D2, and the connecting point the diodes D3 and D4 are connected to both ends of the secondary winding N2. In this way, a diode having small peak inverse voltage can be used. Such a configuration is suitable to be used when output voltage is large. In addition, by using the switching element instead of the diodes D1 to D4, and by using a synchronous rectifying system, further higher efficiency can be attained.

Embodiment 4

Figure 17:
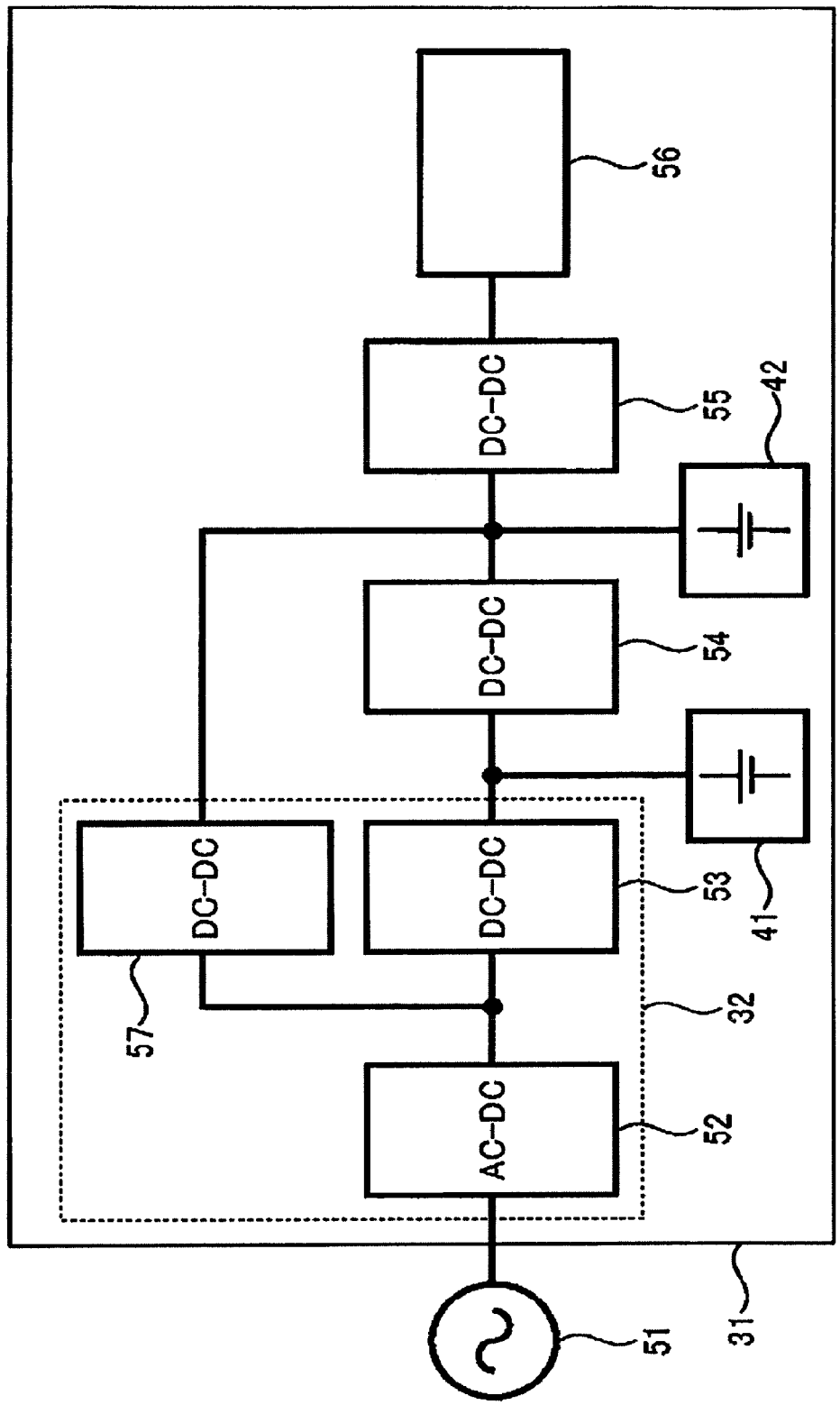
FIG. 17 is a schematic configuration diagram of a power source system of a conventional electric vehicle.

FIG. 17 is a schematic configuration diagram of a power source system of a conventional electric vehicle 31. The charger 32 converts AC power from the AC power source 51 to DC power with the AC-DC converter 52, and the DC-DC converter 53 supplies a power, by transforming DC power to voltage required for charging the battery 41. On the other hand, the DC-DC converter 55 supplies power to the load 56, by transforming voltage of the battery 42, which is lower voltage than voltage of the battery 41. In large power supply amount to the load 56, power of the battery 41 is supplied to the DC-DC converter S55 and the battery 42 by the DC-DC converter 54. However, in the case of small power supply amount to the load 56, such as in charging the battery 41 from the AC power source 51, there was a problem of decrease in power conversion efficiency of the DC-DC converter 54. Accordingly, the charger 32 had the DC-DC converter 57 to supply power from the AC-DC converter 52 to the DC-DC converter 55 and the battery 42 from the DC-DC converter 57 not via the DC-DC converter 54.

Figure 18:
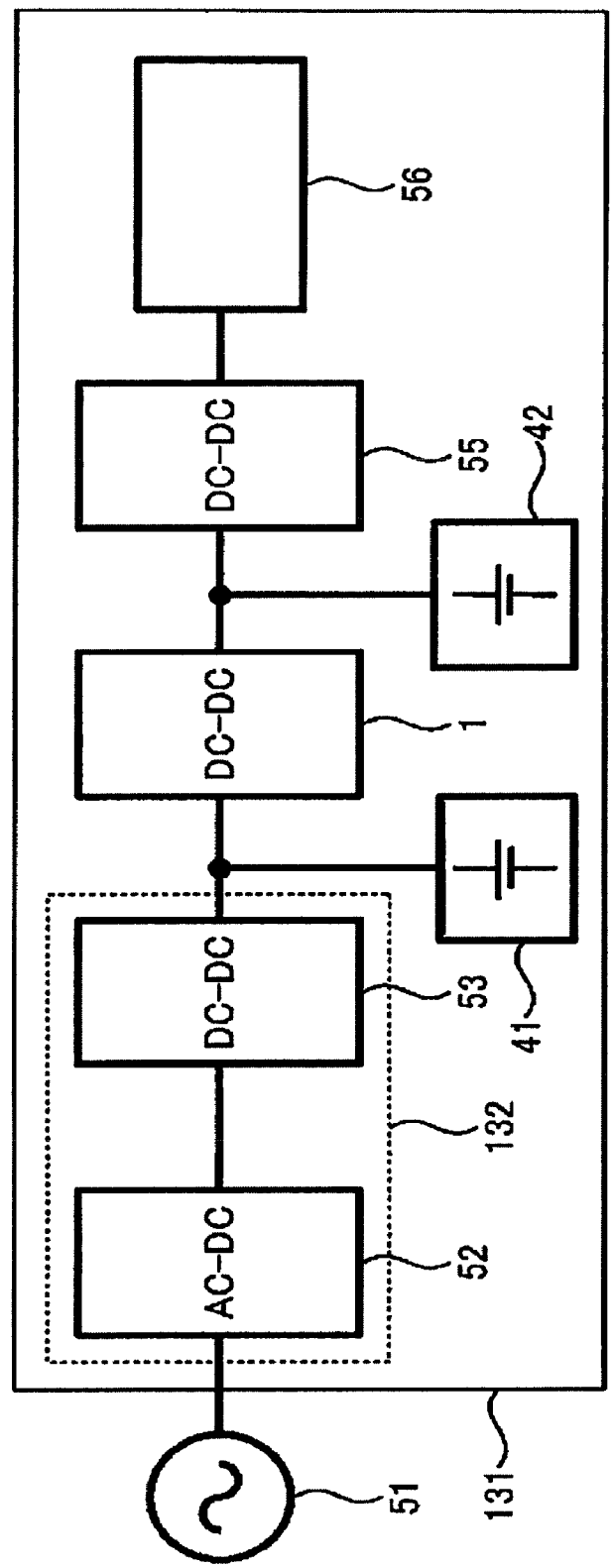
FIG. 18 is a schematic configuration diagram of a power source system of an electric vehicle according to Embodiment 4 of the present invention.

FIG. 18 is a schematic configuration diagram of a power source system of an electric vehicle 131 adopting the DC-DC converter 1 according to Embodiment 4 of the present invention. The same reference code will be furnished to the same parts as in FIG. 17, and explanation thereof is omitted. Adoption of the DC-DC converter 1 explained in the above Embodiment 1, instead of the DC-DC converter 54 in FIG. 17, enables for the DC-DC converter 1 to supply power in high efficiency, even in the case of small power supply amount to the load 56. In this way, the charger 132 requires no DC-DC converter 57 in FIG. 17, enables to reduce parts number and to supply power in high efficiency, while attaining significant cost down.

During charging of the battery 41 by the charger 132 from the AC power source 51, in the vehicle 131, drive frequency of the switching elements S1 and S2 of the DC-DC converter 1 becomes lower in many cases, as compared with drive frequency in the heavy load mode M1. That is, at a time when a vehicle itself is not used such as at midnight, the battery 41 is in a charging state. In such a time, the load 56 is in a very small level minimum required. Therefore, even when power supply amount to a load is considered to be nearly zero, the light load mode M2 has higher efficiency than the heavy load mode M1, and thus it can be said that utilization of the DC-DC converter explained in the present Embodiment, for an electric vehicle is very useful. It should be noted that explanation was given in the present Embodiment on an application embodiment of applying the DC-DC converter explained in Embodiment 1 to the vehicle 131, however, application of the DC-DC converter explained in Embodiment 2 or Embodiment 3 to the vehicle 131 is similarly effective.

REFERENCE SIGNS LIST 1, 53 to 55, 57, 101, 102 DC-DC converter
2 full bridge circuit
3, 4 switching leg
5 control means
6 transformer
7 rectifier circuit
8 current sensor
9 voltage sensor
10, 11 diode leg
31 electric vehicle
32 charger
41,42 battery
51 AC power source
52 AC-DC converter
56,R1 load
131 electric vehicle
132 charger
V1 DC power source
C1,C2 smoothing capacitor
L1, L2, L11, L12 smoothing reactor
Lr reactor
N1, N2 winding
S1~S4 switching element
DS1~DS4 antiparallel diode
CS1~CS4 parasitic capacitance
M1 heavy load mode
M2 light load mode
Pout output power
Pth, Pth1, Pth2 predetermined value
D1~D4 diode
T1, T2 node

The invention claimed is:

1. A DC-DC converter, comprising:
a switch circuit which includes at least one switch and at least one diode connected in parallel to the at least one switch;
wherein the switch circuit is configured to output electric power inputted between first DC terminals to between AC terminals, by utilizing slow reverse recovery characteristics of the diode in which current flows reversely through the diode;
a transformer which includes a primary winding connected between the AC terminals and a secondary winding magnetically connected to the primary winding;
a rectifier circuit which includes a smoothing reactor for smoothing electric power supplied from the transformer;
second DC terminals connected to the rectifier circuit;
wherein the at least one switch includes a first switch, a second switch, a third switch and a fourth switch and the at least one diode includes a first diode, a second diode, a third diode and a fourth diode;
a full bridge circuit which includes a first switching leg configured by connecting the first switch and the second switch in series, and a second switching leg configured by connecting the third switch and the fourth switch in series;
wherein each of both end terminals of the first switching leg and both end terminals of the second switching leg constitute the first DC terminals;
wherein a connection point between the first switch and the second switch and a connection point between the third switch and the fourth switch constitute the AC terminals; and
wherein the switch circuit is configured by the first switch, the second switch, the third switch, the fourth switch and the first diode, the second diode, the third diode, the fourth diode respectively connected in parallel to the first switch, the second switch, the third switch, the fourth switch; and
a control unit which controls the full bridge circuit;
wherein, when a power supply amount between the second DC terminals is a predetermined amount or more, the control unit implements a first mode for driving each of the first to fourth switches, and
wherein, when the power supply amount between the second DC terminals is less than the predetermined amount, the control unit implements a second mode in which a set of the switches of one of the first switching leg and the second switching leg are each turned off and a set of the switches of the other of the first switching leg and the second switching leg are each turned on.

2. The DC-DC converter according to claim 1, wherein the diode is an antiparallel diode.

3. The DC-DC converter according to claim 1, wherein the second mode sets a switching frequency of the set of switches to a high value to increase an output power supply amount.

4. The DC-DC converter according to claim 3, wherein each of the first to fourth switches is configured by a switching element, and
the control unit drives each of the first to fourth switching elements in a phase shift system in a case of implementing the first mode and drives each of the switching elements of the other of the first switching leg and the second switching leg in a frequency control system in a case of implementing the second mode.

5. The DC-DC converter according to claim 3, wherein a capacitor is provided in parallel to each of the first to fourth switches,
each of the first to fourth switches is configured by a switching element, and
a capacitance value of each of the capacitors provided in parallel to the switching elements of the one of the first switching leg and the second switching leg is larger than a capacitance value of each of the capacitors provided in parallel to the switching elements of the other of the first switching leg and the second switching leg.

6. The DC-DC converter according to claim 3, wherein each of the first to fourth switches is configured by a switching element, and a snubber capacitor is provided in parallel to each of the switching elements of the one of the first switching leg and the second switching leg.

7. The DC-DC converter according to claim 3, wherein
each of the first to fourth switches is configured by a switching element, and
a switching characteristic of each of the switching elements of the other of the first switching leg and the second switching leg is faster than a switching characteristic of each of the switching elements of the one of the first switching leg and the second switching leg.

8. The DC-DC converter according to claim 3, wherein
each of the first to fourth switches is configured by a switching element,
each of the switching elements of the other of the first switching leg and the second switching leg is configured by an MOSFET, and
each of the switching elements of the one of the first switching leg and the second switching leg is configured by an IGBT.

9. The DC-DC converter according to claim 3, wherein
each of the first to fourth switches is configured by a switching element,
each of the switching elements of the other of the first switching leg and the second switching leg is configured by an IGBT, and
each of the switching elements of the one of the first switching leg and the second switching leg is configured by an MOSFET.

10. The DC-DC converter according to claim 3, wherein
each of the first to fourth switches is configured by an MOSFET, and
each of the diodes is a body diode of the MOSFET.

* * * * *